United States Patent [19]

Phillips

[11] 4,325,703
[45] Apr. 20, 1982

[54] BELT GUIDING DEVICE

[76] Inventor: Charles O. Phillips, 1440 Alberta Dr., Hamilton, Ohio 45013

[21] Appl. No.: 149,976

[22] Filed: May 15, 1980

[51] Int. Cl.³ ............................................. F16H 7/08
[52] U.S. Cl. ..................................... 474/130; 29/283; 269/249
[58] Field of Search .................... 29/283; 269/249; 294/103 R; 474/122, 130

[56] References Cited

U.S. PATENT DOCUMENTS 4,109,544  8/1978  Clark .................................. 474/130
4,111,063  9/1978  Journey ............................. 474/130

FOREIGN PATENT DOCUMENTS 461460  5/1928  Fed. Rep. of Germany ...... 474/130

*Primary Examiner*—Robert C. Watson
*Attorney, Agent, or Firm*—James W. Pearce; Roy F. Schaeperklaus

[57] ABSTRACT

A device for guiding a belt during mounting on a pulley. A body of the device has a slot for receiving an edge portion of the pulley and a face portion adjacent the slot and substantially parallel with the slot for receiving and supporting the belt. The device is attached to the pulley and holds the belt as the pulley is turned and guides the belt into the pulley.

1 Claim, 6 Drawing Figures

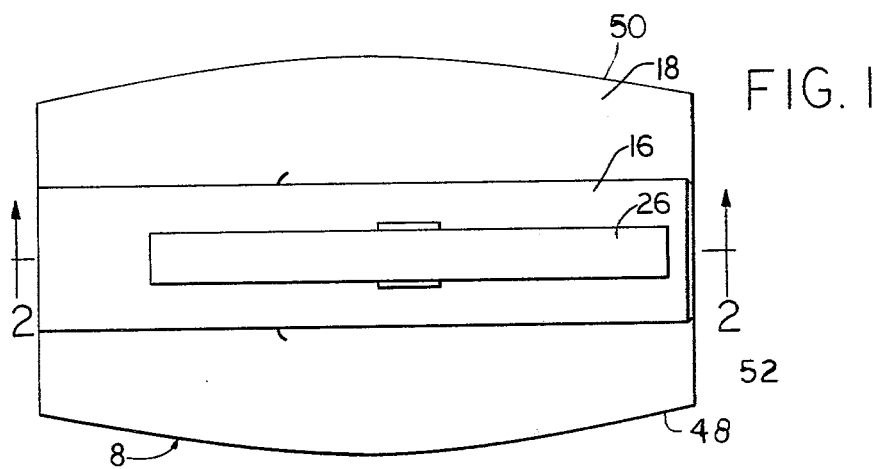
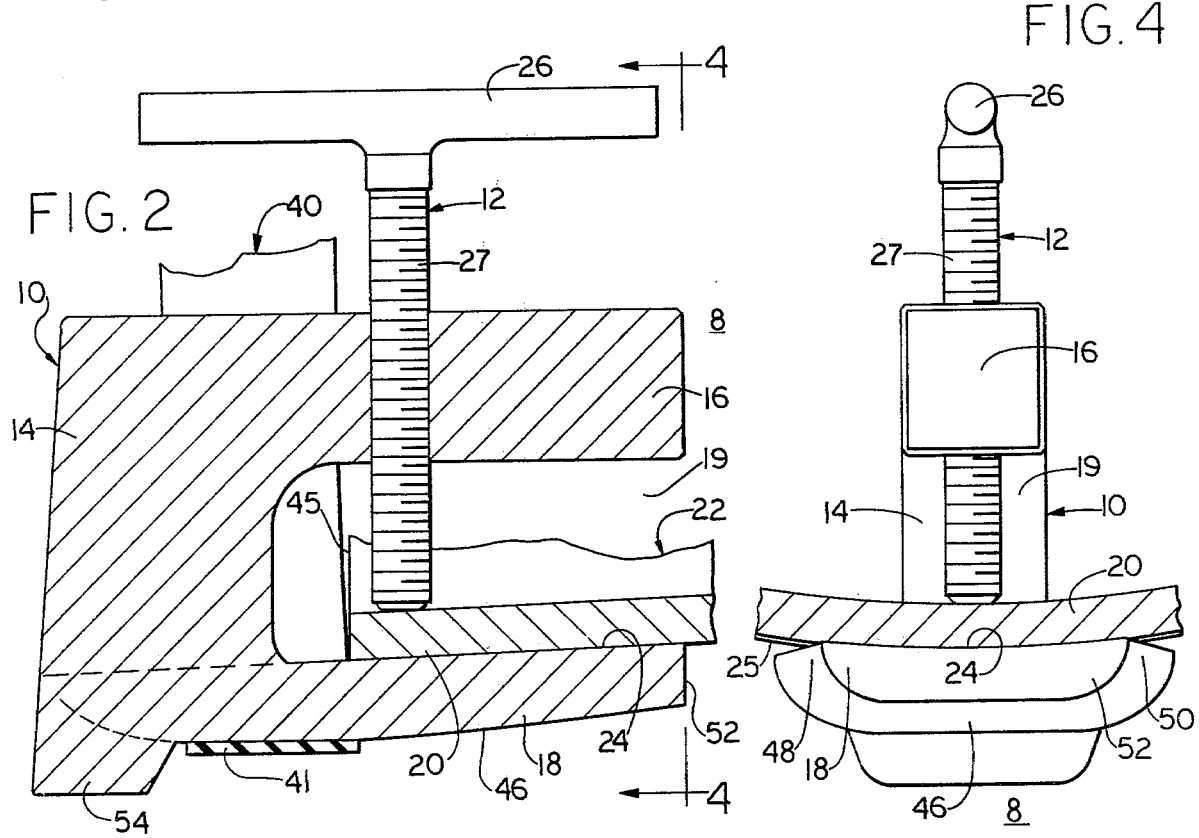
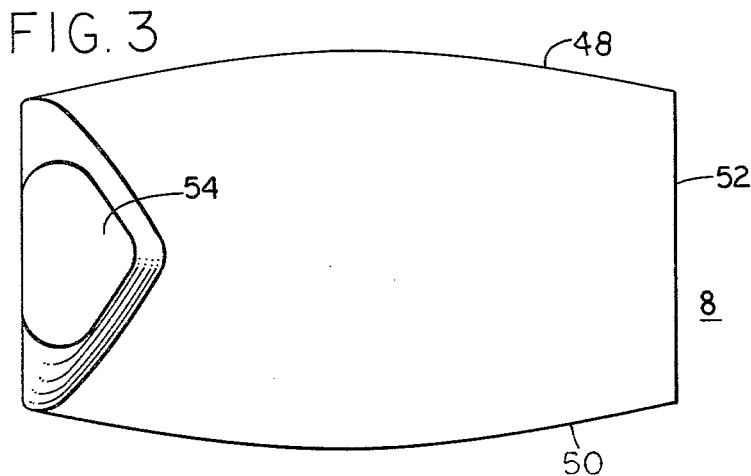

BELT GUIDING DEVICE

This invention relates to a device for mounting a belt on a pulley.

An object of this invention is to provide a belt guide device which holds and guides a belt as the belt is placed around a pulley.

A further object of this invention is to provide a device which can be mounted on an edge of a pulley and which holds the belt in position for mounting on the pulley as the pulley is turned.

Briefly, this invention provides a belt guide device which includes an arm portion which can engage an outer face of a wall of a pulley and a clamp member which can engage an inner face of the wall of the pulley to releasably hold the guide on the pulley. The arm is relatively thin so that, when the belt is mounted on the arm, the belt is only slightly stretched. A flange is mounted on the arm for positioning outboard of the edge of the pulley. The device is mounted on the edge of the pulley and the belt can be mounted on the belt guide device to hold the belt on the pulley as the pulley is turned as the belt can be porgressively slid off the belt guide device onto the pulley.

The above and other objects and features of the invention will be apparent to those skilled in the art to which this invention pertains from the following detailed description and the drawings, in which:

FIG. 1 is a top plan view of a belt guide device constructed in accordance with an embodiment of this invention;

FIG. 2 is a view in section taken on the line 2—2 in FIG. 1, fragmentary portions of a pulley and of a belt being shown in association therewith;

FIG. 3 is a bottom plan view of the belt guide device;

FIG. 4 is a view in section taken generally on the line 4—4 in FIG. 2;

In the following detailed description and the drawings, like reference characters indicate like parts.

Figure 5:
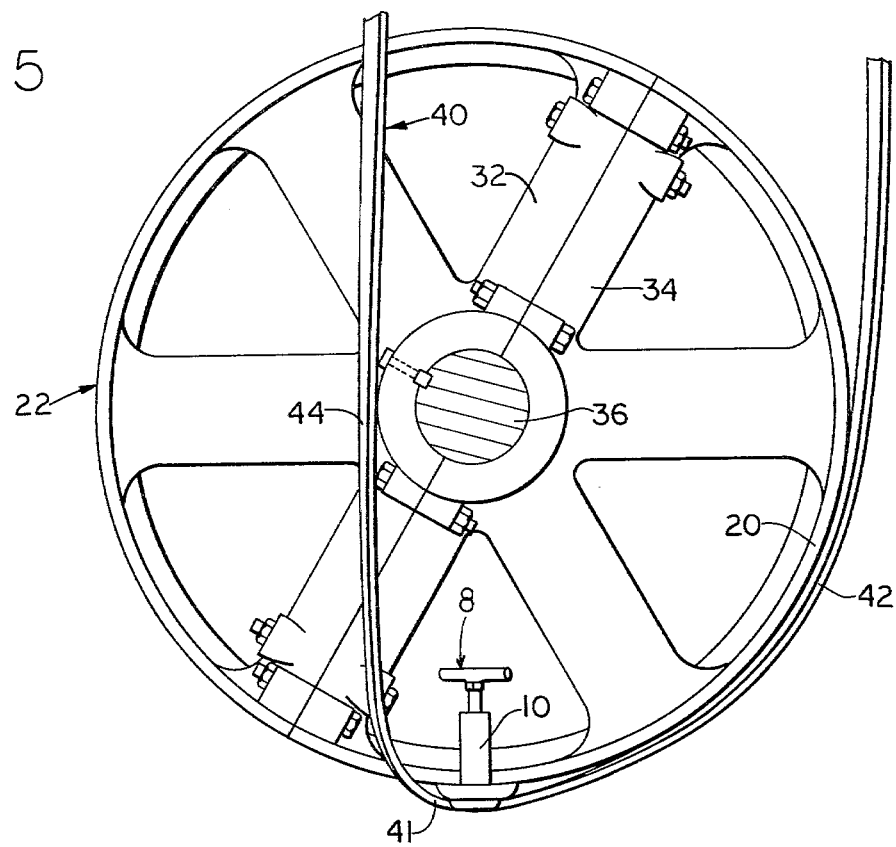
FIG. 5 is a view in end elevation of a pulley on which the belt guide device is mounted, a fragmentary portion of a belt being shown in association therewith in partially mounted position.

In FIGS. 1-4 inclusive is shown a belt guide device 8 constructed in accordance with an embodiment of this invention. The device includes a body 10 and a screw member 12. The body 10 includes a backing portion 14, a main flange 16 and a belt support flange 18. The flanges 16 and 18 extend to one side of the backing portion 14 and can be substantially parallel. A slot 19 is formed between the flanges 16 and 18. An edge portion of a belt supporting wall or falnge 20 of a pulley 22 can be received in the slot 19. The screw member 12 is threaded in the flange 16 and can be turned to advance an end thereof into position to engage and hold the edge portion or flange 20 of the pulley 22 against an inner face 24 of the belt support flange 18. The inner face 24 can be complementary to an outer face 25 of the pulley flange 20. A handle 26 is mounted on a threaded shank portion 27 of the screw member 12 for use in turning of the screw member.

The belt guide device 8 can be mounted on the edge portion 20 of the pulley 22 as shown in FIGS. 2, 3, 5 and 6. The pulley 22 can be of the type commonly used in supplying power to machinery and can include pulley halves 32 and 34 (FIGS. 5 and 6) mounted on a shaft 36 by means of bolt fasteners 38.

Figure 6:
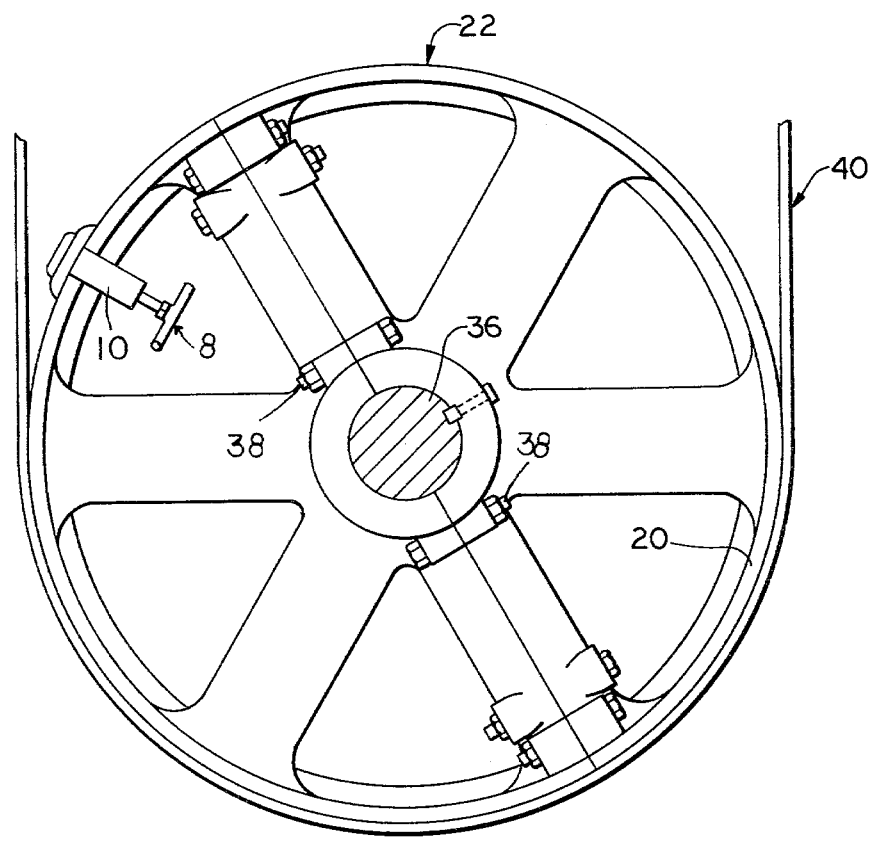
FIG. 6 is a view in end elevation of the pulley with the device being shown after mounting of the belt has been completed.

When a belt 40 is to be mounted on the pulley 22, the belt 40 can be hung as shown in FIGS. 2 and 5 from an overhead pulley (not shown) and can be draped so that a lowermost portion 41 of the belt extends around the body 10, a portion 42 of the belt overlies the flange 20 and a portion 44 of the belt 40 overlies an edge 45 of the pulley flange 20. The shaft 36 and the pulley 22 can be turned in a clockwise direction as shown in FIGS. 5 and 6, and the belt 40 can be guided onto the flange 20 by the belt guide device 8 as the pulley 22 is turned to the FIG. 6 position at which the belt 40 is mounted on the face 25 of the pulley 22. Then the screw member 12 can be loosened and the device 8 can be removed from the pulley 22. A lower or belt supporting pulley face portion 46 of the flange 18 and of the body 10 supports the belt 41 as the belt is being mounted on the pulley 22. The face portion 46 is generally parallel to the slot 19. As shown in FIGS. 1 and 3, sides 48 and 50 of the flange 18 converge toward a free end 52 of the flange 18 so that the belt 40 tends to advance toward the right as shown in FIG. 2 as the belt is being advanced from the device 8. A lug 54 on the backing portion 14 of the body 10 remote from the free end 52 of the flange 18 extends outwardly to prevent slippage of the belt to the left as shown in FIG. 2.

The belt guide device shown in the drawings and described above is subject to structural modification without departing from the spirit and scope of the appended claims.

Having described my invention, what I claim as new and desire to secure by Letters Patent is:

1. A device for guiding a belt during mounting of the belt on a pulley which comprises a body having slot means for receiving an edge portion of a belt supporting wall of the pulley and a face portion adjacent the slot means and substantially parallel with the slot means for receiving and supporting the belt, means for releasably attaching the device to the pulley with the edge portion of the pulley in the slot means and with the face portion adjacent to and outboard of a belt supporting pulley face of the belt supporting wall of the pulley, the face portion having an open end for discharging the belt from the device onto the belt supporting pulley face, side walls of the face portion converging toward the free end thereof to direct the belt toward the belt supporting face of the pulley, and lug means on the device limiting sliding of the belt on the face portion away from the open end thereof.

* * * * *